(12) United States Patent
Pritchard et al.

(10) Patent No.: US 10,948,028 B2
(45) Date of Patent: Mar. 16, 2021

(54) DRIVELINE COMPONENT HAVING ROTATABLE SHAFT WITH CENTRIFUGAL VALVE MOUNTED THERETO

(71) Applicant: BorgWarner Inc., Auburn Hills, MI (US)

(72) Inventors: Larry A. Pritchard, Macomb, MI (US); Robert F. Keller, Chesterfield, MI (US); Christopher Sullivan, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 63 days.

(21) Appl. No.: 16/381,012

(22) Filed: Apr. 11, 2019

(65) Prior Publication Data

US 2020/0325943 A1 Oct. 15, 2020

(51) Int. Cl.
*F16D 13/74* (2006.01)
*B60K 23/08* (2006.01)
*B60K 25/06* (2006.01)
*F16K 31/524* (2006.01)
*F16H 57/04* (2010.01)

(52) U.S. Cl.
CPC .......... *F16D 13/74* (2013.01); *B60K 23/0808* (2013.01); *B60K 25/06* (2013.01); *F16H 57/0427* (2013.01); *F16K 31/52408* (2013.01); *B60K 2025/065* (2013.01)

(58) Field of Classification Search
None
See application file for complete search history.

(56) References Cited

U.S. PATENT DOCUMENTS

| | | | |
|---|---|---|---|
| 2,642,844 A * | 6/1953 | Flinn | F16D 25/0638 91/422 |
| 4,238,020 A * | 12/1980 | Nerstad | F16D 43/284 137/542 |
| 6,840,363 B2 | 1/2005 | Braford, Jr. et al. | |
| 8,845,473 B2 | 9/2014 | Nett et al. | |
| 9,249,873 B2 | 2/2016 | Pump et al. | |
| 9,303,696 B2 | 4/2016 | Phelps et al. | |
| 9,303,754 B2 | 4/2016 | Nett et al. | |
| 9,656,549 B2 | 5/2017 | Nett et al. | |
| 9,902,263 B2 | 2/2018 | Pump | |
| 2002/0079180 A1 * | 6/2002 | Mohan | F16D 25/0638 192/35 |
| 2006/0289267 A1 * | 12/2006 | Ito | F16D 25/0638 192/85.3 |

(Continued)

*Primary Examiner* — Timothy Hannon
(74) *Attorney, Agent, or Firm* — Burris Law, PLLC

(57) ABSTRACT

A driveline component with a shaft, a friction clutch and a centrifugal valve. The shaft has a supply passage and a feed passage that intersects the supply passage. The centrifugal valve has a valve seat, which is formed on the shaft and intersects the feed passage, a valve element and a flyweight that is pivotally coupled to the shaft. The valve element is received in the valve seat and is movable between a first position, in which the valve element is abutted against the valve seat, and a second position in which the valve element is displaced from the valve seat. The flyweight has a weight and a cam and is configured so that radially outward rotation of the weight in response to centrifugal force causes the cam to drive the valve element toward the first position.

11 Claims, 4 Drawing Sheets

(56) References Cited

U.S. PATENT DOCUMENTS

2016/0146271 A1* 5/2016 Niffenegger ........ F16H 63/3069
                                                    192/85.63
2018/0010649 A1* 1/2018 Sullivan ................ F16D 13/648
2018/0010682 A1* 1/2018 Pritchard ............ F16H 57/0473

* cited by examiner

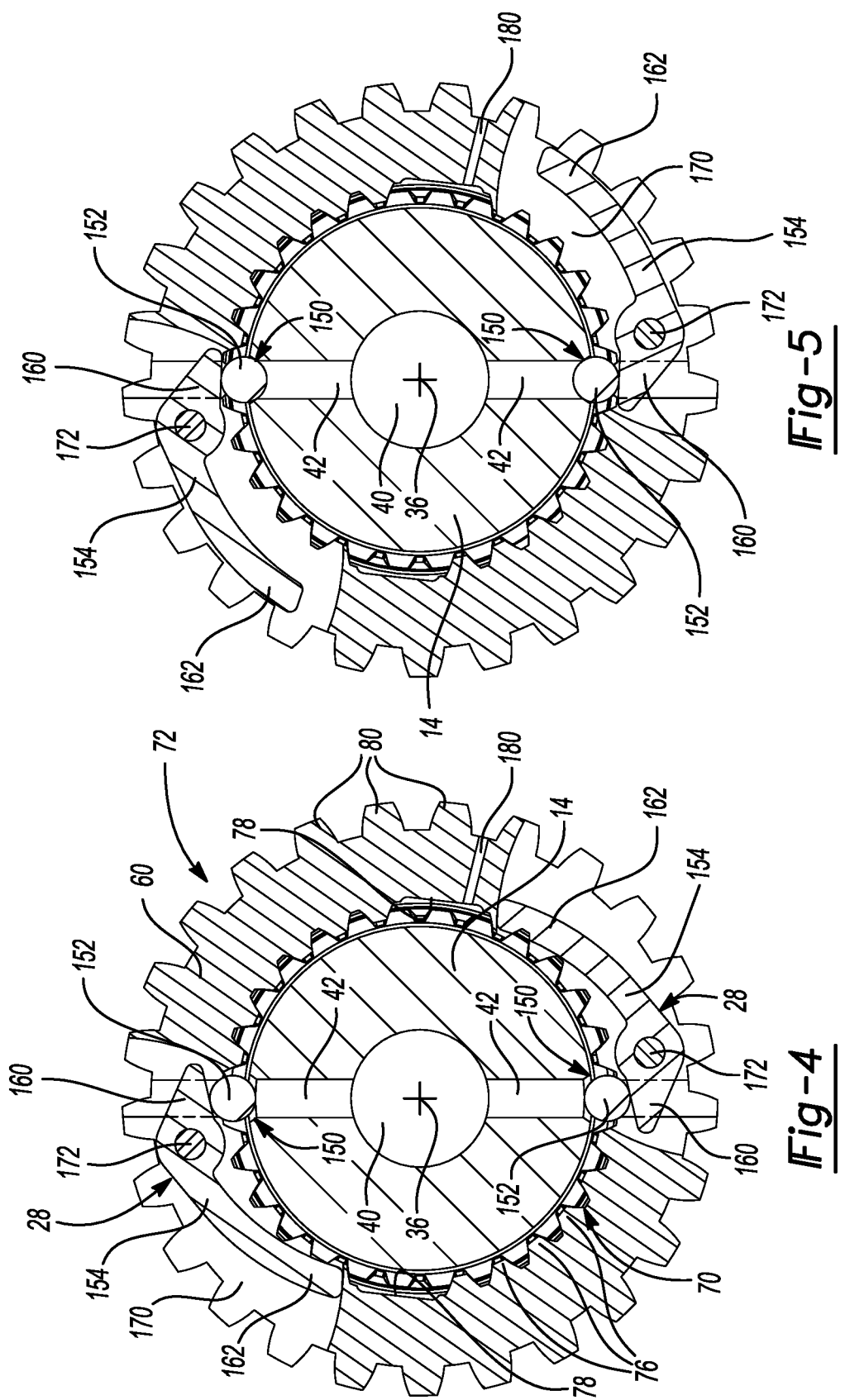

DRIVELINE COMPONENT HAVING ROTATABLE SHAFT WITH CENTRIFUGAL VALVE MOUNTED THERETO

FIELD

The present disclosure relates to a driveline component having a rotatable shaft with a centrifugal valve mounted thereto.

BACKGROUND

It is increasingly desirable to provide a vehicle driveline having four-wheel or all-wheel drive capability that can also be operated in a two-wheel drive mode when additional traction is not desired and/or increased fuel is desired. Many of these disconnecting drivelines employ a friction clutch to permit selective engagement of torque-transmitting components of these drivelines. While friction clutches can be desirable in disconnectable driveline components, some drawbacks have been acknowledged. For example, friction clutches require consistent lubrication while they operate so as to eliminate the potential for undue wear. However, the presence of lubrication between the friction or clutch plates can transmit rotary power through the friction clutch even when the friction clutch is otherwise disengaged, which can waste power and reduce the efficiency of the driveline.

SUMMARY

This section provides a general summary of the disclosure, and is not a comprehensive disclosure of its full scope or all of its features.

In one form, the present disclosure provides a driveline component having a first shaft, a clutch and a centrifugal valve. The first shaft is rotatable about a first axis and has a supply passage and a feed passage that intersects the supply passage. The clutch has a clutch hub, a clutch basket and a clutch pack. The clutch hub is coupled to the first shaft for rotation therewith. The clutch pack has a plurality of first clutch plates, which are coupled to the clutch hub for rotation therewith, and a plurality of second clutch plates that are interleaved with the first clutch plates and coupled to the clutch basket for rotation therewith. The centrifugal valve has a valve seat, a valve element and a flyweight. The valve seat is formed on an exterior circumferential surface of the first shaft and intersects the feed passage. The valve element is received in the valve seat and is movable between a first position, in which the valve element is abutted against the valve seat, and a second position in which the valve element is displaced from the valve seat. The flyweight is pivotally coupled to the first shaft and has a weight portion and a cam portion. The cam portion is configured so that rotation of the weight portion outwardly away from the first shaft in response to centrifugal force causes the cam portion to drive the valve element toward the first position.

In another form, the present disclosure provides a method for controlling lubrication to a friction clutch in a driveline component having a two-speed transmission. The method includes: operating a lubrication pump to supply pressurized lubricant to a centrifugal valve that is coupled to the first shaft for rotation therewith; driving a first shaft about a first axis through the two-speed transmission with the two-speed transmission operating in a first reduction ratio, wherein a rotational speed of the centrifugal valve about the first axis is insufficient to close the centrifugal valve so that pressurized lubricant supplied to the centrifugal valve is dispensed through the centrifugal valve to a clutch hub of the friction clutch; moving a movable element of the two-speed transmission to cause the two-speed transmission to operate in a second reduction ratio that is smaller than the first reduction ratio; and, with the two-speed transmission operating in the second reduction ratio, rotating the first shaft at a rotational speed that closes the centrifugal valve to at least substantially reduce a flow of the pressurized lubricant that is dispensed through the centrifugal valve to a clutch hub of the friction clutch.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4 and 5 are lateral cross-sectional views taken through the first shaft, the clutch hub and a pair of centrifugal valves showing valve elements of the centrifugal valves in second and first positions, respectively.

Corresponding reference numerals indicate corresponding parts throughout the several views of the drawings.

DETAILED DESCRIPTION

Figure 1:
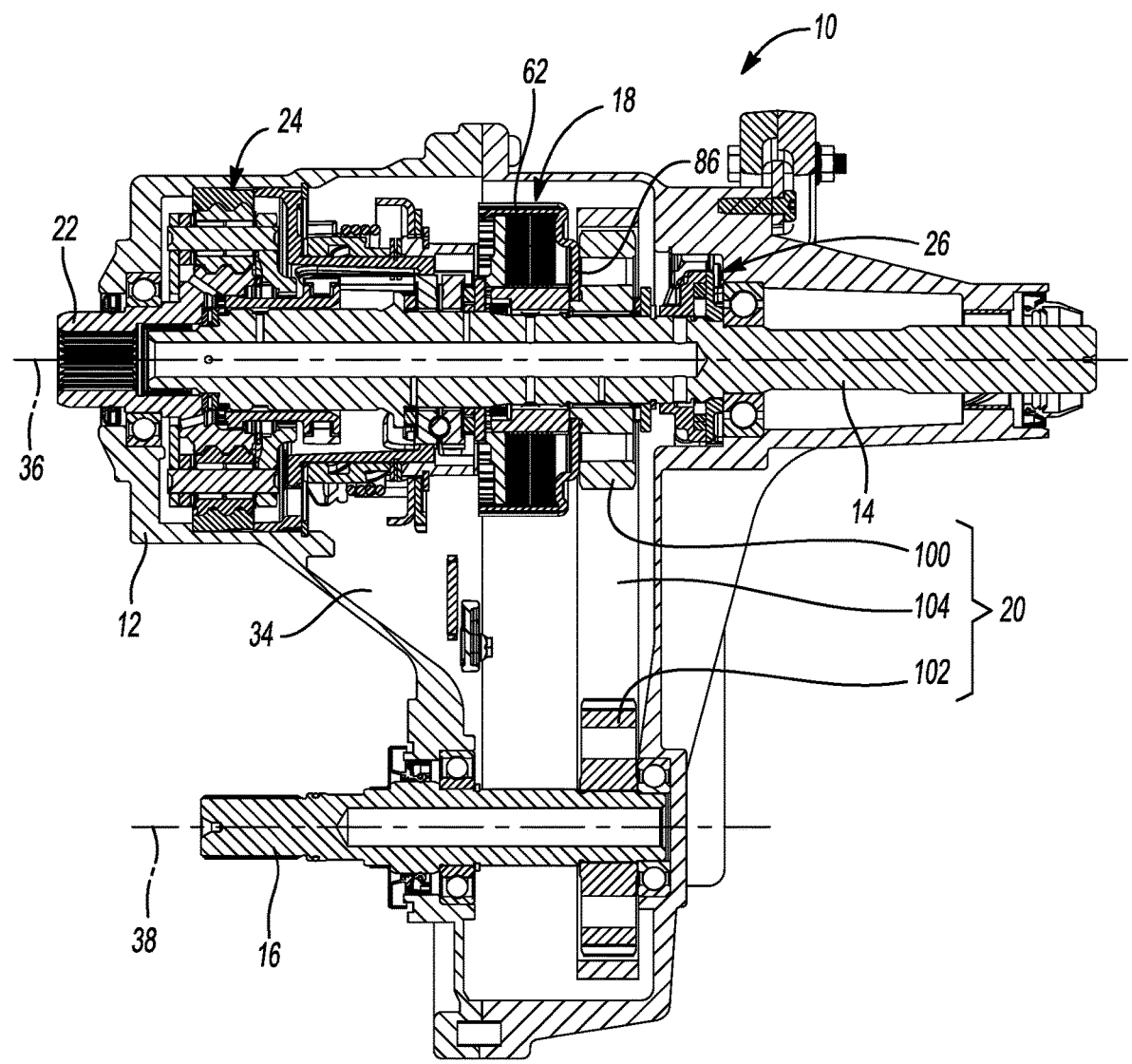
FIG. 1 is a longitudinal cross-sectional view of an exemplary vehicle driveline component constructed in accordance with the teachings of the present disclosure.

With reference to FIG. 1 of the drawings, an exemplary power transmitting component constructed in accordance with the teachings of the present disclosure is generally indicated by reference numeral 10. The power transmitting component 10 is illustrated as being a transfer case, but it will be appreciated that the teachings of the present disclosure have application to other type of power transmitting components and as such, it will be understood that the particular example provided is not intended to limit the scope of the claims in any way.

The power transmitting component can include a housing 12, a first shaft 14, a second shaft 16, a clutch 18, a power transfer mechanism 20, an input member 22, a transmission 24, a pump 26 and a centrifugal valve 28. The housing 12 can define a cavity 34 into which the first and second shafts 14 and 16, the clutch 18, the power transfer mechanism 20, the input member 22, the transmission 24, the pump 26 and the centrifugal valve 28 can be received. The housing 12 can support the first shaft 14 for rotation about a first axis 36 and can support the second shaft 16 for rotation about a second axis 38.

Figure 2:
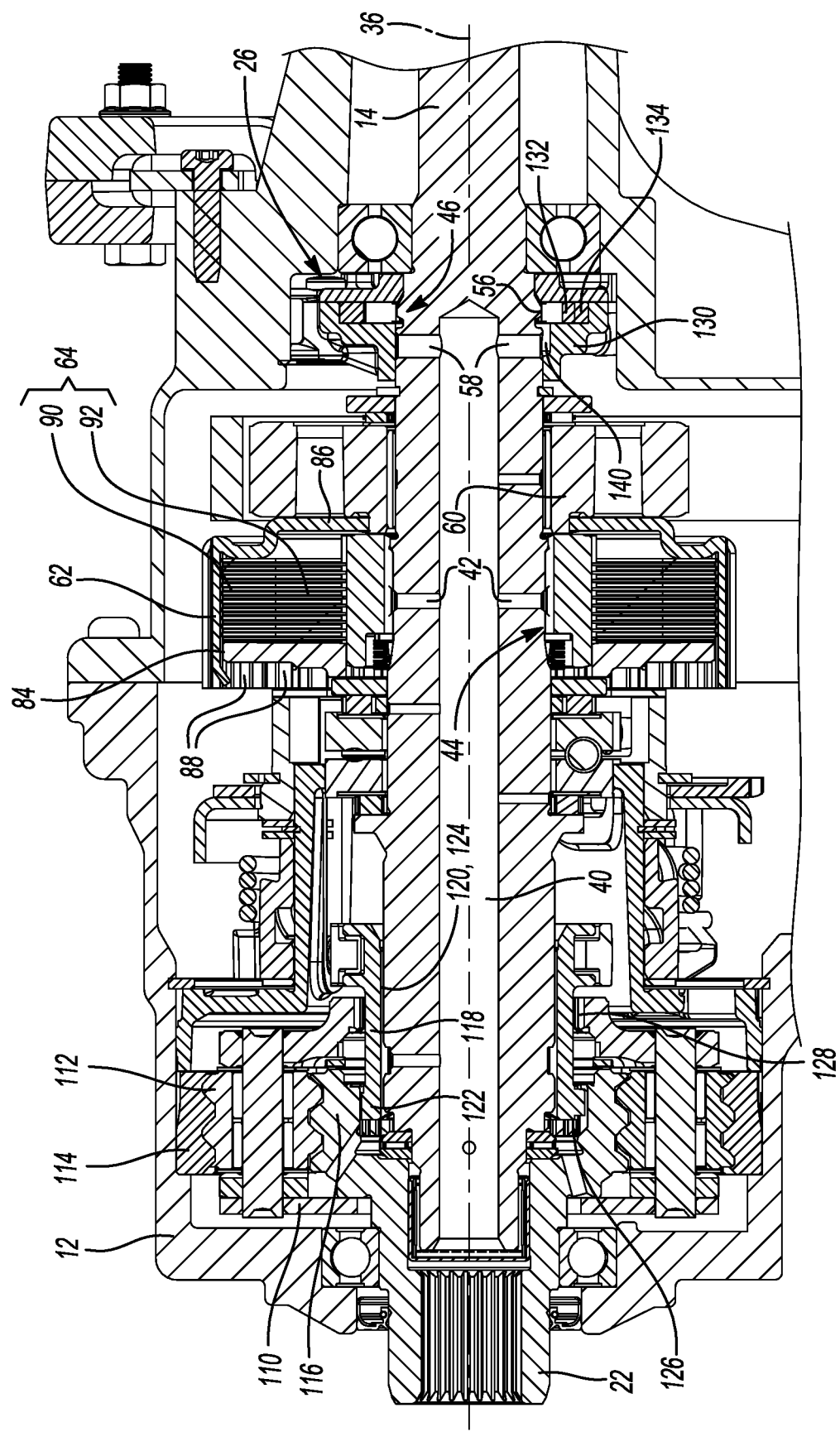
FIG. 2 is an enlarged portion of FIG. 1.
Figure 3:
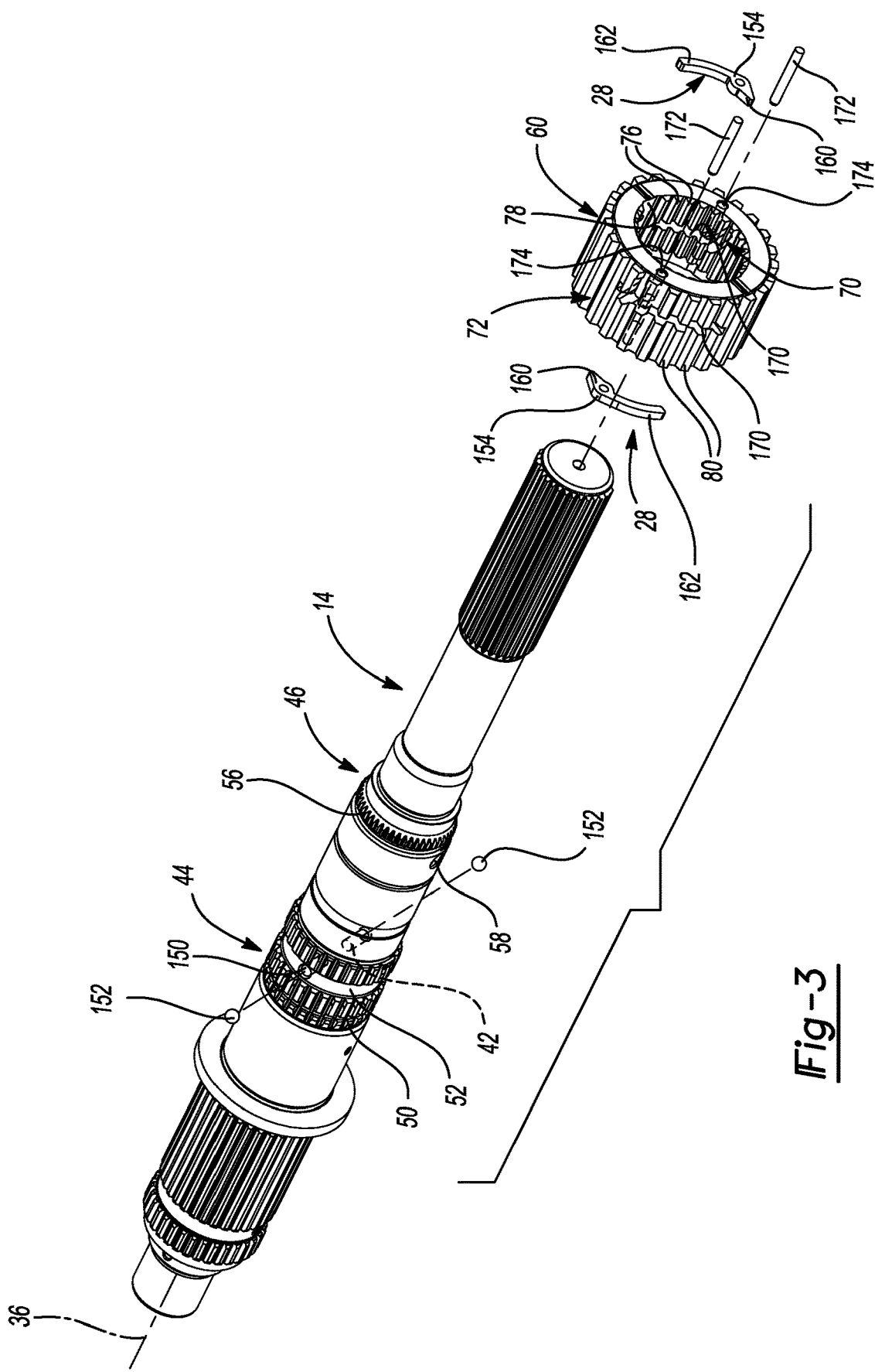
FIG. 3 is an exploded perspective view of a portion of the vehicle driveline component of FIG. 1, illustrating a first shaft and a clutch hub in more detail.

With reference to FIGS. 2 and 3, the first shaft 14 can define a supply passage 40, one or more feed passages 42, a clutch mount 44, and a pump mount 46. The supply passage 40 can be formed longitudinally through all or a portion of the first shaft 14, while the feed passages 42 can extend radially between an exterior surface of the first shaft 14 and the supply passage 40. The clutch mount 44 can comprise a first set of external shaft teeth 50, and a circumferentially extending lubrication groove 52, which is formed through the first set of external shaft teeth 50 at a location between the opposite axial ends of the first set of external shaft teeth 50. The pump mount 46 can comprise a second set of external shaft teeth 56 and a radially extending inlet bore 58 that can intersect the supply passage 40.

The clutch 18 can be any type of clutch, such as a friction clutch having a clutch hub 60, a clutch basket 62 and a clutch pack 64.

In FIGS. 3 and 4, the clutch hub 60 can have a shaft mount 70 and a plate mount 72. In the example provided, the clutch hub 60 is a hollow-cylindrical structure with the shaft mount 70 being formed on the inside diameter of the clutch hub 60 and the plate mount 72 being formed on the outside diameter of the clutch hub 60. The shaft mount 70 comprises a set of internal hub teeth 76, which are matingly engaged with the first set of external shaft teeth 50 to thereby couple the clutch hub 60 to the first shaft 14 for common rotation about the first axis 36, and a pair of longitudinally extending oil grooves 78 that can each be formed between respective adjacent teeth of the set of internal hub teeth 76 and can intersect the circumferentially extending lubrication groove 52 that is formed in the clutch mount 44 on the first shaft 14. The plate mount 72 comprises a set of external hub teeth 80.

With renewed reference to FIG. 2, the clutch basket 62 is received on the first shaft 14 and is rotatable relative to the first shaft 14 and the clutch hub 60. The clutch basket 62 includes a circumferentially extending wall 84, which is disposed concentrically about the clutch hub 60, and a radial wall 86 that extends radially inwardly from the circumferentially extending wall 84. The circumferentially extending wall 84 defines a set of internal basket teeth 88. The radial wall 86 can abut an axial end of the clutch hub 60.

The clutch pack 64 includes a set of first friction or clutch plates 90 and a set of second friction or clutch plates 92. The first clutch plates 90 define an internally splined or toothed aperture (not specifically shown) that is received over the clutch hub 60 and in engagement with the set of external hub teeth 80 (FIG. 3) so that the first clutch plates 90 are non-rotatably but axially slidably coupled to the clutch hub 60. The second clutch plates 92 are interleaved with the first clutch plates 90 and have an externally splined or toothed circumference (not specifically shown) that is received into the clutch basket 62 and in engagement with the set of internal basket teeth 88 so that the second clutch plates 92 are non-rotatably but axially slidably coupled to the clutch basket 62.

Returning to FIG. 1, the power transfer mechanism 20 can comprise any means for transmitting rotary power between the first and second shafts 14 and 16, such as a transmission. In the example provided, the power transfer mechanism 20 includes first and second sprockets 100 and 102, respectively, and a chain 104 that is engaged to the first and second sprockets 100 and 102 to transmit rotary power therebetween. The first sprocket 100 is coupled to the radial wall 86 of the clutch basket 62 for rotation therewith, while the second sprocket 102 is coupled to the second shaft 16 for rotation therewith.

In FIG. 2, the input member 22 is configured to transmit rotary power in a power transmission path between a source of rotary power, such as a vehicle powertrain (not shown), and the first shaft 14. In the example provided, the input member 22 is a shaft that is supported by the housing 12 for rotation about the first axis 36.

The transmission 24, which is optional, can be disposed in the power transmission path between the input member 22 and the first shaft 14. In the example illustrated, the transmission 24 is a single stage, two-speed planetary gearset having a planet carrier 110, a plurality of planet gears 112, a ring gear 114, a sun gear 116 and a coupling sleeve 118. The planet carrier 110 is fixedly coupled to the input member 22 and journally supports each of the planet gears 112 for rotation about respective planet gear axes that are disposed circumferentially about the first axis 36. The ring gear 114 is fixedly coupled to the housing 12 and is disposed about the planet carrier 110 so as to be in meshing engagement with the planet gears 112. The sun gear 116 can be coupled to the input member 22 for rotation therewith. The sun gear 116 can be received within the planet carrier 110 and radially between the planet gears 112. The sun gear 116 is meshed with the planet gears 112. The coupling sleeve 118 can have a set of internal teeth 120, a set of external engagement teeth 122. The internal teeth 122 can be non-rotatably but axially slidably coupled to mating teeth 124 formed on the first shaft 14 to permit the coupling sleeve 118 to be moved between a high range position and a low range position. Placement of the coupling sleeve 118 in the low range position meshes the external engagement teeth 122 on the coupling sleeve 118 with mating teeth 126 on the sun gear 116, which causes the transmission 24 to operate in a first gear ratio (i.e., a low-speed ratio). Positioning of the coupling sleeve 118 in the high range position meshes the external engagement teeth 122 on the coupling sleeve 118 with mating teeth 128 formed on the planet carrier 110, which causes the transmission to operate in a second gear ratio (i.e., a high-speed ratio with a 1:1 gear ratio in which the rotational speed of the coupling sleeve 118 and the first shaft 14 is equal to the rotational speed of the planet carrier 110 and the input member 22).

The pump 26 is configured to receive rotary power from the first shaft 14 and to output a pressurized fluid that is transmitted through the inlet bore(s) 58 in the first shaft 14. The pump 26 can be any type of pump, such as a gear pump or a vane pump, but in the particular example provided, the pump 26 is a gerotor pump having a pump housing 130, a first rotor 132 and a second rotor 134. The first rotor 132 has a set of internal rotor teeth (not specifically shown) that are matingly engaged with the second set of external shaft teeth 56 on the first shaft 14 to thereby couple the first rotor 132 to the first shaft 14 for common rotation. The second rotor 134 can be received in the pump housing 130 about the first rotor 132 and can comprise teeth or lobes (not specifically shown) that are meshingly engaged with corresponding teeth or lobes (not specifically shown) formed on the first rotor 132. Fluid pressure generated by relative rotation between the first and second rotors 132 and 134 is discharged through a pump outlet 140 that is formed in the pump housing 130 and which is disposed about the circumference of the first shaft 14 in an area or region around the radially extending inlet bore 58.

With renewed reference to FIGS. 3 and 4, the centrifugal valve 28 can comprise one or more valve sets having a valve seat 150, a valve element 152 and a flyweight 154. In the particular example provided, the centrifugal valve 28 comprises two valve sets that are disposed 180 degrees apart from one another. Each valve seat 150 is formed into the exterior circumferential surface of the first shaft 14 and intersects an associated one of the feed passages 42. The valve element 152 and the valve seat 150 are configured with complementary surfaces that are configured to seal against one another. In the example provided, the valve seat 150 is a frustoconically shaped chamfer, while the valve element 152 is a spherically shaped ball. The valve element 152 is movable relative to the valve seat 150 between a first position, in which the valve element 152 is abutted against the valve seat 150, and a second position in which the valve element 152 is spaced apart or displaced from the valve seat 150. The flyweight 154 has a cam portion 160 and a weight portion 162 and is pivotally coupled to the first shaft 14. The cam portion 160 is configured to drive the valve element 152 toward the valve seat 150 when centrifugal force acting on the weight portion 162 rotates the weight portion 162 outwardly away from the first shaft 14. In the example provided, the flyweight 154 and valve element 152 are received into a circumferentially extending pocket 170 that is formed into the clutch hub 60, and a pivot pin 172, which is formed in a pin aperture 174 that extends axially through the clutch hub 60, extends through the flyweight 154 to pivotally mount the flyweight 154 to the clutch hub 60. It will be appreciated that the flyweight 154 could be pivotally mounted directly to the first shaft 14 in the alternative. The flyweight 154 can be configured so that no part of the flyweight 154 extends in-line with any one of the external hub teeth 80 when the valve element 152 is moved by the flyweight 154 from the second position to the first position. Stated another way, the flyweight 154 pivots within a region of the clutch hub 60 that is radially inwardly of the set of external hub teeth 80 so that the flyweight 154 does not contact the first clutch plates 90 during operation of the vehicle driveline component 10.

With reference to FIGS. 2 and 4, rotation of the first shaft 14 will cause corresponding operation of the pump 26 so that pressurized lubricant output from the outlet 140 of the pump 26 is transmitted through the inlet bore 58, into the supply passage 40 and to the feed passage(s) 42. Fluid pressure acting on the valve element 152 will normally urge the valve element 152 toward its second position (FIG. 4), which pivots the weight portion 162 of the flyweight 154 radially inwardly toward the first shaft 14 and the cam portion 160 of the flyweight 154 radially outwardly from the first shaft 14. If the rotational speed of the first shaft 14 is not sufficient to cause the weight portion 162 of the flyweight 154 to pivot outwardly from the first shaft 14 so that the cam portion 160 drives the valve element 152 to its first position (FIG. 5), pressurized lubricant can pass through the centrifugal valve 28, into the circumferentially extending lubrication groove 52 in the first shaft 14 and the longitudinally extending oil grooves 78 that are formed in the clutch hub 60 and through apertures 180 formed radially through the clutch hub 60 that intersect the longitudinally extending oil grooves 78. In this way, pressurized lubrication can be provided to the clutch pack 64 from the clutch hub 60. In situations where the rotational speed of the first shaft 14 is sufficient to cause the weight portion 162 of the flyweight 154 to pivot outwardly from the first shaft 14 so that the cam portion 160 drives the valve element 152 to its first position, then engagement of the valve element 152 to the valve seat 150 halts the supply of pressurized lubricant to the clutch pack 64 via the clutch hub 60.

It will be appreciated that during operation the input member 22 of the vehicle driveline component 10 can be driven through a predetermined range of rotational speeds. In the example provided, the flyweight 154 is configured so that when the transmission 24 is operated in the first or low-speed gear ratio and the input member 22 is driven at a rotational speed within the predetermined range of rotational speeds, the centrifugal force that acts on it is insufficient to counteract the force of the fluid that acts on the valve element 152 and drive the valve element 152 into the first position where it engages the valve seat 150. When the transmission 24 is operated in the second or high-speed gear ratio, however, the input member 22 can be driven at a rotational speed that is both within the predetermined range of rotational speeds and sufficiently high to cause the centrifugal force that acts on the flyweight 154 to counteract the force of the fluid that acts on the valve element 152 and drive the valve element 152 into the first position where it engages the valve seat 150. Configuration in this manner ensures that pressurized lubricant can pass through the centrifugal valve 28 at the relatively low speeds that the first shaft 14 will rotate in when the clutch 18 is engaged and requires lubrication, as well as inhibits the flow of pressurized lubricant through the centrifugal valve 28 when the first shaft 14 rotates at relatively high rotational speeds that occur only when the clutch 18 is not engaged and where lubrication of the clutch 18 would not be advantageous. It will be appreciated that the input member 22 can be driven at relatively low rotational speeds when the transmission 24 is operated in the second or high-speed gear ratio, and that operation of the vehicle driveline component—in this manner will not generate sufficient centrifugal force on the flyweight 154 to counteract the force of the fluid that acts on the valve element 152 and drive the valve element 152 into the first position where it engages the valve seat 150. In such situations, pressurized lubricant can pass through the centrifugal valve 28, but due to the relatively low speed operation of the vehicle driveline component 10, the adverse impact on the efficiency of the vehicle driveline component 10 caused by the provision of pressurized lubricant to the clutch 18 will not be significant.

It will be appreciated that the present disclosure also provides a method for controlling lubrication to a friction clutch in a driveline component having a two-speed transmission. The method includes: operating a lubrication pump to supply pressurized lubricant to a centrifugal valve that is coupled to the first shaft for rotation therewith; driving a first shaft about a first axis through the two-speed transmission with the two-speed transmission operating in a first reduction ratio, wherein a rotational speed of the centrifugal valve about the first axis is insufficient to close the centrifugal valve so that pressurized lubricant supplied to the centrifugal valve is dispensed through the centrifugal valve to a clutch hub of the friction clutch; moving a movable element of the two-speed transmission to cause the two-speed transmission to operate in a second reduction ratio that is smaller than the first reduction ratio; and, with the two-speed transmission operating in the second reduction ratio, rotating the first shaft at a rotational speed that closes the centrifugal valve to at least substantially reduce a flow of the pressurized lubricant that is dispensed through the centrifugal valve to a clutch hub of the friction clutch.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A driveline component comprising:
a first shaft that is rotatable about a first axis, the first shaft having a supply passage and a feed passage that intersects the supply passage;

a clutch having a clutch hub, a clutch basket and a clutch pack, the clutch hub being coupled to the first shaft for rotation therewith, the clutch pack having a plurality of first clutch plates, which are coupled to the clutch hub for rotation therewith, and a plurality of second clutch plates that are interleaved with the first clutch plates and coupled to the clutch basket for rotation therewith; and a centrifugal valve having a valve seat, a valve element and a flyweight, the valve seat being formed on an exterior circumferential surface of the first shaft and intersecting the feed passage, the valve element being received in the valve seat and movable between a first position, in which the valve element is abutted against the valve seat, and a second position in which the valve element is displaced from the valve seat, the flyweight being pivotally coupled to the first shaft and having a weight portion and a cam portion, the cam portion being configured so that rotation of the weight portion outwardly away from the first shaft in response to centrifugal force causes the cam portion to drive the valve element toward the first position.

2. The driveline component of claim 1, further comprising a pump driven by the first shaft, the pump having a pump outlet that is in fluid communication with the supply passage.

3. The driveline component of claim 2, wherein the pump is a gerotor pump.

4. The driveline component of claim 2, further comprising an input member and a two-speed transmission that is disposed in a power path between the input member and the first shaft.

5. The driveline component of claim 4, wherein the input member is configured to be driven at a rotational speed that is less than or equal to a maximum rotational speed, wherein the two-speed transmission is selectively operable in a low-speed ratio and in a high-speed ratio and wherein the flyweight is configured so that when the input member is driven at the maximum rotational speed and the two-speed transmission is operated in the low-speed ratio, the centrifugal force acting on the flyweight is not sufficient to counteract a force applied to the valve element by pressurized fluid in the feed passage and drive the valve element into the first position.

6. The driveline component of claim 5, further comprising a first sprocket, which is coupled to the clutch basket for rotation therewith, a second shaft, which is rotatable about a second axis that is offset from the first axis, a second sprocket, which is rotatably coupled to the second shaft, and a chain that is drivingly coupled to the first and second sprockets.

7. The driveline component of claim 1, wherein the flyweight is received in a circumferentially extending pocket formed in the clutch hub, wherein a plurality of external hub teeth are formed about a circumference of the clutch hub, and wherein no part of the flyweight extends in-line with any one of the external hub teeth when the flyweight moves the valve element from the second position to the first position.

8. The driveline component of claim 7, wherein a lubrication channel extends axially through at least one of the clutch hub the first shaft, wherein the lubrication channel is configured to receive lubrication that is discharged from the centrifugal valve, and wherein a plurality of lubrication apertures are formed through the clutch hub and intersect the lubrication channel.

9. The driveline component of claim 1, wherein the first shaft comprises a plurality of external shaft teeth, and wherein the clutch hub comprises a plurality of internal hub teeth that are engaged to the external shaft teeth.

10. The driveline component of claim 9, wherein the clutch hub is a hollow cylindrical structure and comprises a plurality of external hub teeth.

11. The driveline component of claim 1, wherein the valve element comprises a spherical ball.

\* \* \* \* \*